United States Patent
Naruse

(10) Patent No.: US 9,727,298 B2
(45) Date of Patent: Aug. 8, 2017

(54) DEVICE AND METHOD FOR ALLOCATING DATA BASED ON AN ARRANGEMENT OF ELEMENTS IN AN IMAGE

(71) Applicant: Sony Corporation, Tokyo (JP)

(72) Inventor: Tetsuya Naruse, Tokyo (JP)

(73) Assignees: Sony Corporation, Tokyo (JP); Sony Mobile Communications, Inc., Tokyo (JP)

(*) Notice: Subject to any disclaimer, the term of this patent is extended or adjusted under 35 U.S.C. 154(b) by 362 days.

(21) Appl. No.: 13/903,407

(22) Filed: May 28, 2013

(65) Prior Publication Data

US 2014/0355819 A1    Dec. 4, 2014

(51) Int. Cl.
| | | |
|---|---|---|
| G06K 9/00 | (2006.01) | |
| G06F 3/14 | (2006.01) | |
| H04R 3/00 | (2006.01) | |
| H04R 5/04 | (2006.01) | |
| H04R 27/00 | (2006.01) | |

(52) U.S. Cl.
CPC .......... *G06F 3/1446* (2013.01); *G06F 3/1423* (2013.01); *G09G 2354/00* (2013.01); *G09G 2356/00* (2013.01); *G09G 2370/022* (2013.01); *G09G 2370/16* (2013.01); *H04R 3/00* (2013.01); *H04R 5/04* (2013.01); *H04R 27/00* (2013.01); *H04R 2227/003* (2013.01); *H04R 2400/00* (2013.01); *H04R 2410/00* (2013.01); *H04R 2499/11* (2013.01)

(58) Field of Classification Search
CPC .... G06F 3/1446; G06F 3/14; G06F 17/30056; G06F 3/0481; G06F 7/24; G06F 3/1423; G06T 2200/16; G09G 2354/00; G09G 2356/00; G09G 2370/16; G06G 2370/022; H04R 3/00; H04R 5/04; H04R 27/00
See application file for complete search history.

(56) References Cited

U.S. PATENT DOCUMENTS

| | | | | |
|---|---|---|---|---|
| 7,091,926 | B2* | 8/2006 | Kulas | 345/1.1 |
| 7,453,418 | B2* | 11/2008 | Palmquist | G06F 1/1601 |
| | | | | 345/1.1 |
| 7,697,925 | B1* | 4/2010 | Wilson | H04M 1/22 |
| | | | | 455/418 |

(Continued)

FOREIGN PATENT DOCUMENTS

| | | |
|---|---|---|
| JP | 2003-5947 A | 1/2003 |
| JP | 2003005947 A * | 1/2003 |

*Primary Examiner* — Jonathan S Lee
(74) *Attorney, Agent, or Firm* — Oblon, McClelland, Maier & Neustadt, L.L.P.

(57) ABSTRACT

A host device may include an imaging unit configured to capture an image of a guest device, and a communication unit configured to communicate with the guest device. The host device may include circuitry configured to identify, in the image of the guest device, identification information corresponding to the guest device, the identification information being displayed on a screen included on the guest device. The circuitry may calculate, based on the identification of the identification information in the image, an arrangement position of the guest device. The circuitry may assign, based on the calculated arrangement position, assigned data to the guest device. The circuitry may transmit one or more of the calculated arrangement position and information associated with the assigned data to the guest device.

20 Claims, 11 Drawing Sheets

(56) References Cited

U.S. PATENT DOCUMENTS

| | | | |
|---|---|---|---|
| 7,706,634 B2 * | 4/2010 | Schmitt et al. | 382/294 |
| 8,644,757 B2 * | 2/2014 | Curcio | G06F 1/1626 345/156 |
| 8,842,113 B1 * | 9/2014 | Holt et al. | 345/419 |
| 2003/0017823 A1 * | 1/2003 | Mager | H04M 1/22 455/414.1 |
| 2007/0011140 A1 * | 1/2007 | King et al. | 707/3 |
| 2007/0204218 A1 * | 8/2007 | Weber | G01C 21/20 715/234 |
| 2007/0287489 A1 * | 12/2007 | Inselberg | G06Q 30/0242 455/517 |
| 2008/0238954 A1 * | 10/2008 | Hasuike | G06F 3/0421 345/698 |
| 2009/0105856 A1 * | 4/2009 | Kurt | H05B 37/029 700/90 |
| 2009/0322706 A1 * | 12/2009 | Austin | 345/175 |
| 2010/0053164 A1 * | 3/2010 | Imai | G06F 3/011 345/427 |
| 2010/0111491 A1 * | 5/2010 | Kamoto | 386/66 |
| 2010/0144283 A1 * | 6/2010 | Curcio | G06F 1/1626 455/66.1 |
| 2011/0043514 A1 * | 2/2011 | Hussain et al. | 345/213 |
| 2011/0131663 A1 * | 6/2011 | Kaikuranta | G06F 3/0486 726/28 |
| 2011/0267459 A1 * | 11/2011 | Choi | 348/135 |
| 2012/0105466 A1 * | 5/2012 | Leslie | G09G 5/12 345/589 |
| 2012/0184304 A1 * | 7/2012 | Walsh et al. | 455/457 |
| 2012/0280898 A1 * | 11/2012 | Lucero | G06F 3/1446 345/156 |
| 2013/0009983 A1 * | 1/2013 | Ishitsuka | H04N 1/00453 345/619 |
| 2013/0214995 A1 * | 8/2013 | Lewin | G06F 3/1446 345/1.3 |
| 2014/0009366 A1 * | 1/2014 | Chang | 345/1.1 |
| 2014/0019520 A1 * | 1/2014 | Milburn et al. | 709/203 |
| 2014/0104139 A1 * | 4/2014 | Buchner | G06F 3/1438 345/1.3 |
| 2014/0229998 A1 * | 8/2014 | Oh | 725/74 |
| 2014/0253417 A1 * | 9/2014 | Brown | G06F 3/1446 345/2.3 |
| 2014/0302773 A1 * | 10/2014 | Jantunen | H04W 8/005 455/3.01 |
| 2015/0061971 A1 * | 3/2015 | Choi | G06F 3/1446 345/2.3 |
| 2015/0084837 A1 * | 3/2015 | Mese | 345/1.3 |

* cited by examiner

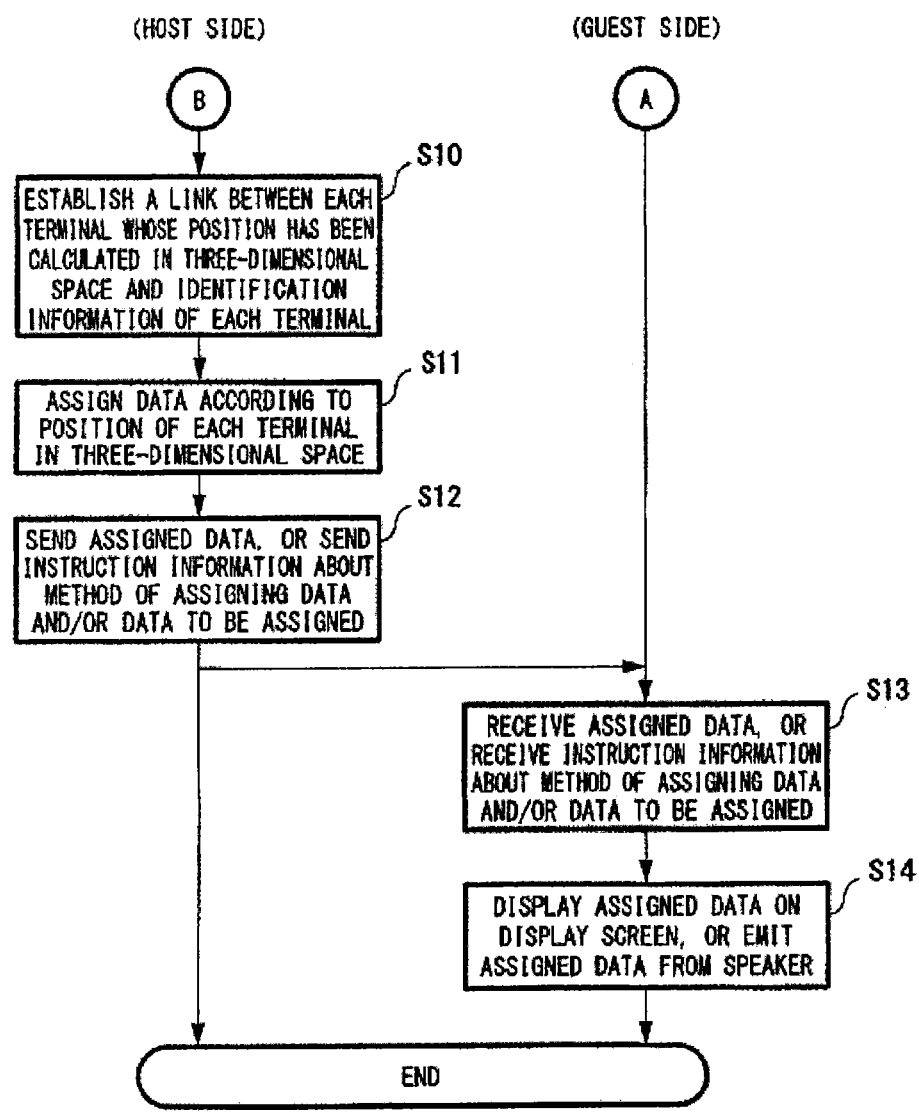

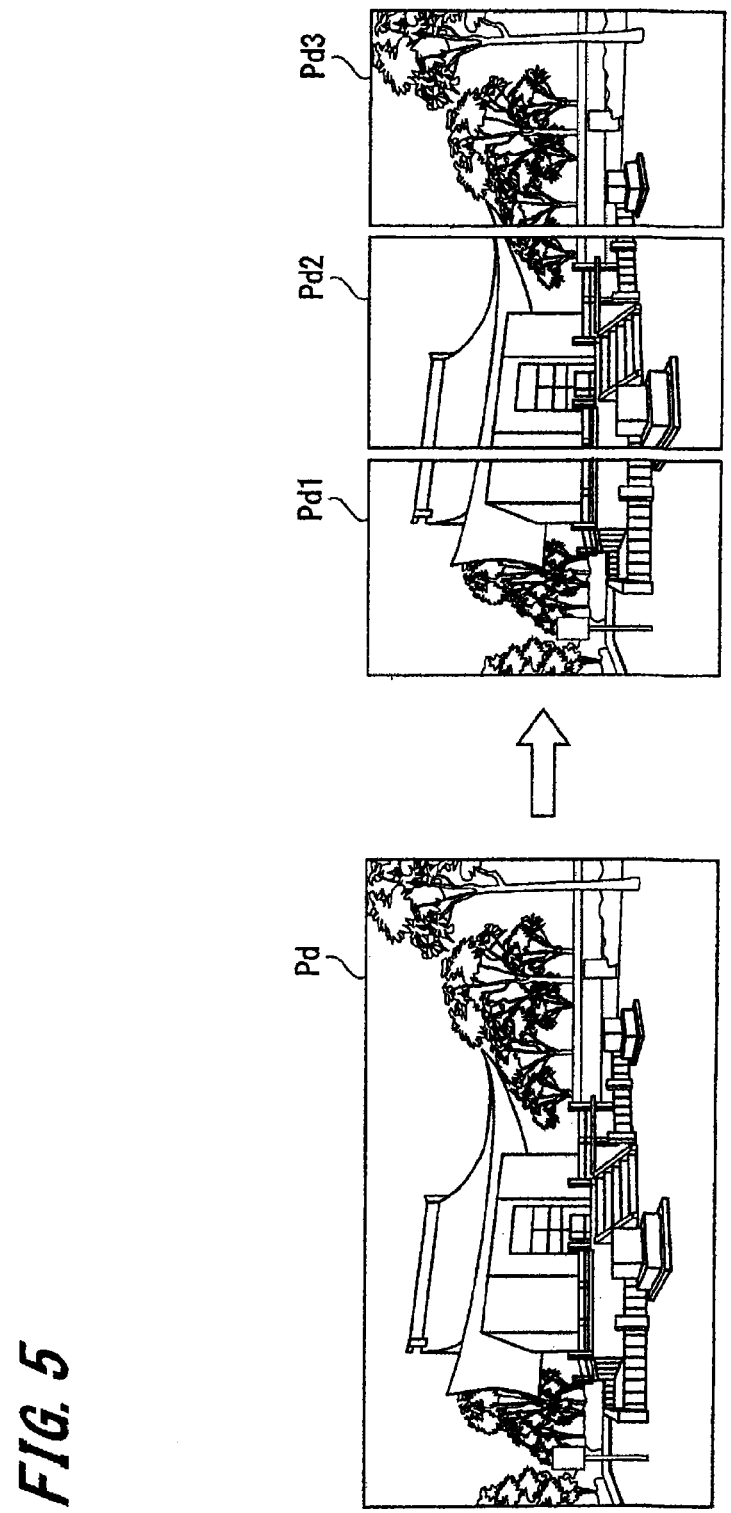

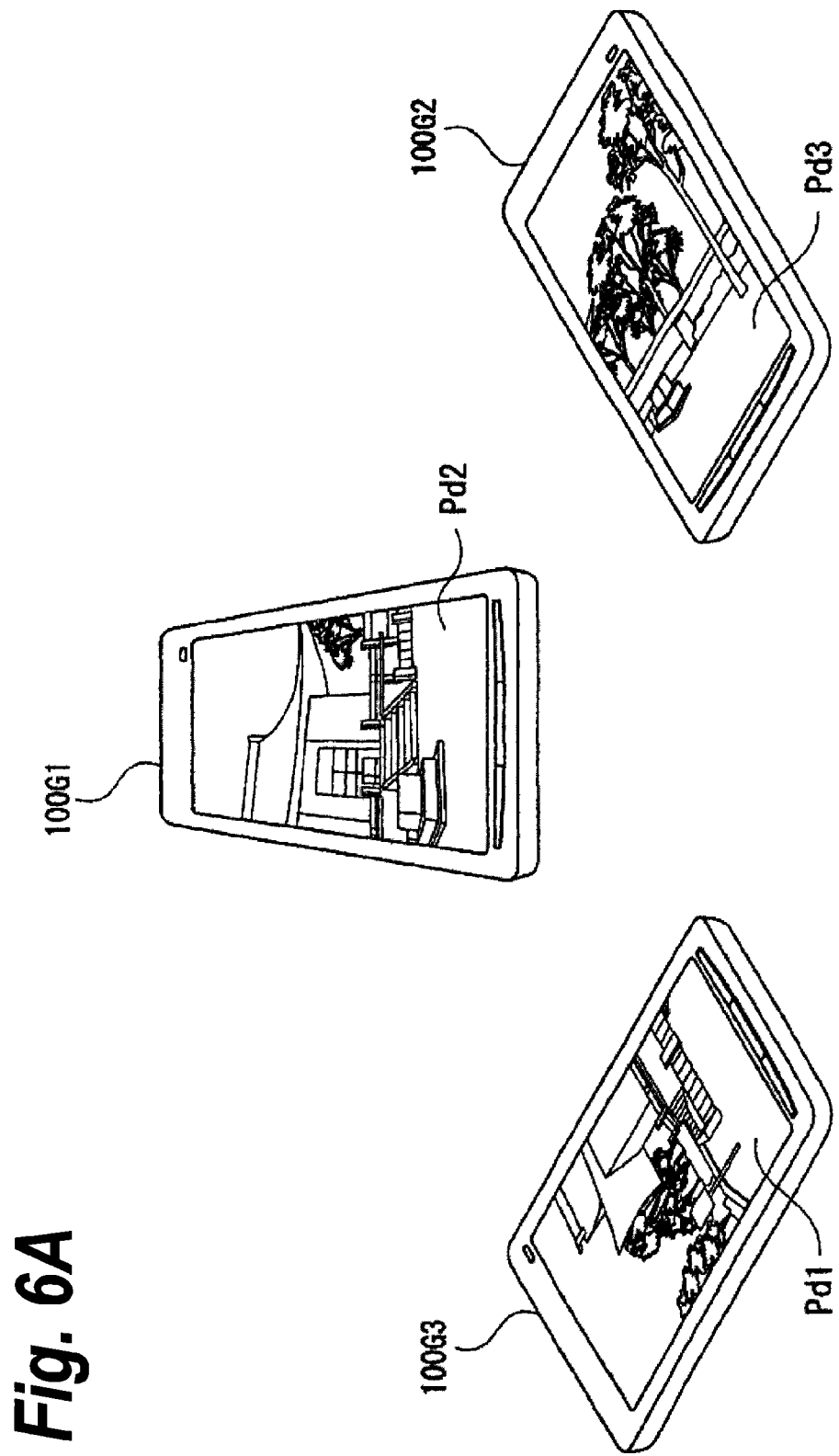

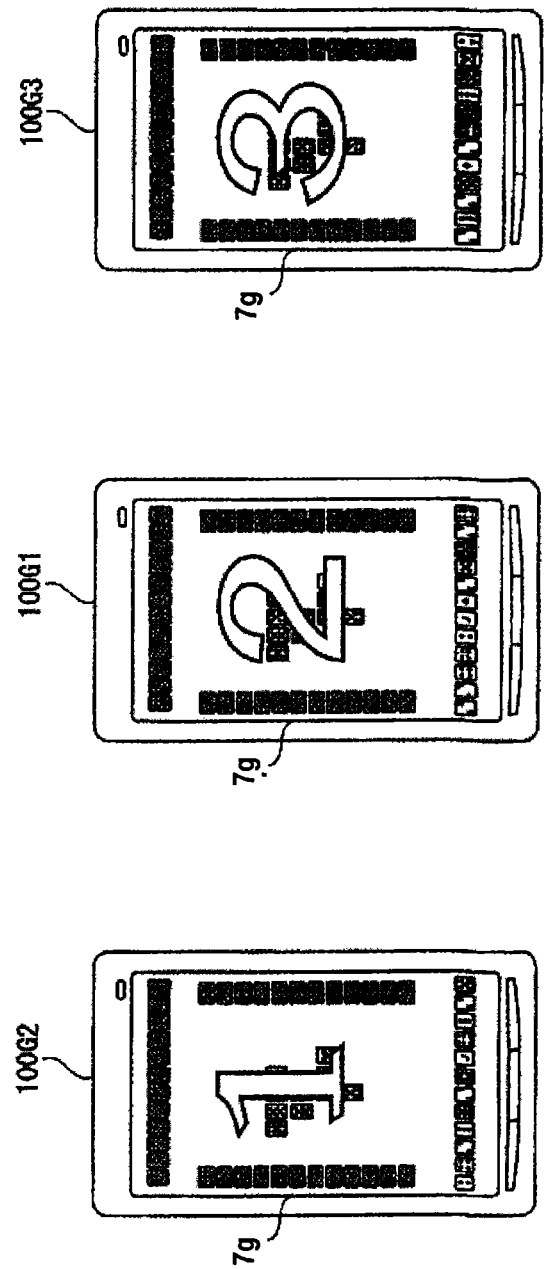

DEVICE AND METHOD FOR ALLOCATING DATA BASED ON AN ARRANGEMENT OF ELEMENTS IN AN IMAGE

BACKGROUND

Technical Field

The present disclosure relates generally to a device and method for allocating data based on an arrangement of other apparatus, and for transmitting the allocated data.

Description of Related Art

Devices are available for performing image processing related to identifying arrangement features of an image. For example, image processing may be performed such that a face is detected in an image. Further, the detected face may be correlated to a user, based on detected features of the face. The detected features of the face may include the manner in which facial features are arranged. In this case, the device may determine qualitative and quantitative measurements of a facial feature arrangement using the captured image. For example, the device may calculate a spacing of an individual's eyes in the image, and/or determine a direction at which the face is pointed in the image. Moreover, data may be assigned to an identified face, and the assigned data may be shared between devices, e.g., on a network.

SUMMARY

Among other things, the present disclosure describes a host device that performs arrangement determination of an object captured in an image. The host device may include an imaging unit configured to capture an image of a guest device. The host device may include a communication unit configured to communicate with the guest device. The host device may include circuitry configured to identify, in the image of the guest device, identification information corresponding to the guest device, the identification information being displayed on a screen included on the guest device. The circuitry may calculate, based on the identification of the identification information in the image, an arrangement position of the guest device. The circuitry may assign, based on the calculated arrangement position, assigned data to the guest device. The circuitry may transmit one or more of the calculated arrangement position and information associated with the assigned data to the guest device.

The foregoing summary and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 3 and 4 illustrate exemplary flow charts for performing terminal arrangement position determination; and FIGS. 5-10 illustrate exemplary aspects of assigning data based on a determined arrangement position.

DETAILED DESCRIPTION

Figure 1:
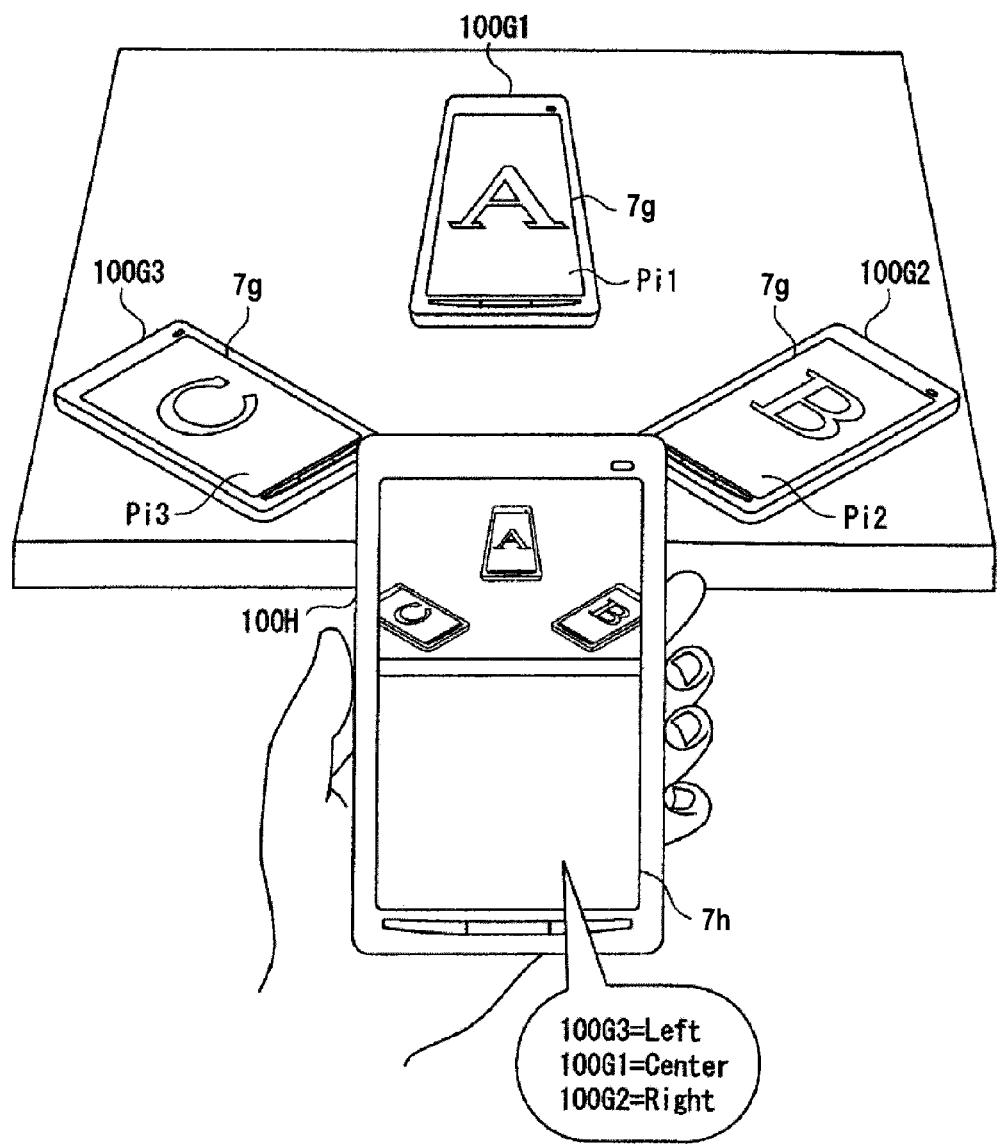
FIG. 1 illustrates an exemplary arrangement of guest terminals and a host terminal.

Referring now to the drawings, wherein like reference numerals designate identical or corresponding parts throughout the several views.

FIG. 1 illustrates guest terminals 100G1, 100G2, and 100G3, which are arranged on a flat surface in a state where each guest terminal has its display 7g facing upward from the flat surface. While the present example describes mobile phone devices, it should be appreciated that the present disclosure may easily be adapted such that the features, processes, and algorithms discussed herein are performed on other devices, such as a desktop computer, a laptop computer, a tablet computer, an e-reader, a personal digital assistant, or the like. In this non-limiting example, guest terminal 100G1 displays terminal identification image Pi1 ("A") on its display 7g; guest terminal 100G2 displays terminal identification image Pi2 ("B") on its display 7g; and guest terminal 100G3 displays terminal identification image Pi3 ("C") on its display 7g. The images Pi1-Pi3 may include identification information specific to each guest terminal, and/or may be correlated to a description of another object or person. The correlation may be determined by relationship information stored in advance. Non-limiting examples of terminal identification information that may be displayed include a letter, a number, an image, a device address, a serial number, a code, and a bar code.

In addition to the three guest terminals 100G1-G3, FIG. 1 shows a host terminal 100H. The host terminal 100H may be a device similar to any of the guest terminals 100G1-G3. Display 7h of the host terminal 100H displays an image corresponding to the guest terminals 100G1-G3 lying on the flat surface. The image displayed on the host terminal 100H may be a still image or a moving image. Based on the displayed image, the host terminal 100H may ascertain an arrangement position of the three guest terminals 100G1-G3 in three-dimensional (3D) space. Specifically, host terminal 100H may recognize data included in the images Pi1-Pi3 displayed on the guest terminal 100G1-G3, and match this identification information with a corresponding position in 3D space. Additionally, the host terminal 100H may utilize identification information included in the images to associate the terminal with a particular device/object/person. Moreover, the host terminal 100H may allocate a layout position for each displayed guest terminal 100G1-G3, based on the determined 3D arrangement position. In the example of FIG. 1, the display 7 of the host terminal 100H has allocated a layout position that corresponds the guest terminal 100G1 to "Center," the guest terminal 100G2 to "Right," and the guest terminal 100G3 to "Left."

The guest terminals 100G1-G3 may be configured to transmit the image shown on their respective displays via wired or wireless transmission paths. Additionally, the host terminal 100H may transmit information related to the determined arrangement positions, allocated layout positions, data associated with the arrangement position or layout position, and/or instructions for obtaining the data associated with the arrangement position or layout position. For example, the host terminal 100H may be configured to transmit (receive) data to (from) the guest terminals 100G1-G3. Moreover, the guest terminals 100G1-G3 may perform similar communication and/or data exchange amongst each other.

Using the terminal identification information included in images on the guest terminals 100G1-G3, the host terminal 100H may identify a particular guest terminal, e.g., based on a predetermined relationship stored in a memory. For example, the host terminal 100H may detect an "A" on the display 7g of the guest terminal 100G1, and match the detected character with the particular device. Alternatively, the guest terminals 100G1-G3 may transmit relationship correlation information to the host terminal 100H (and vice versa) such that device identification can be performed in real-time.

Moreover, the host terminal 100H may perform the above-described arrangement position and/or layout determination automatically, or the determinations may be managed manually using an interface included in the host terminal 100H. Additionally, in response to a detected change in position of a guest terminal 100G1-G3, the host terminal 100H may use previously determined device identification relationships when updating arrangement positions and/or allocated layout positions. Such updated information may be automatically exchanged amongst devices when a change in position is detected, or the images and related data may be exchanged manually (e.g., based on receipt of a request signal).

Figure 2:
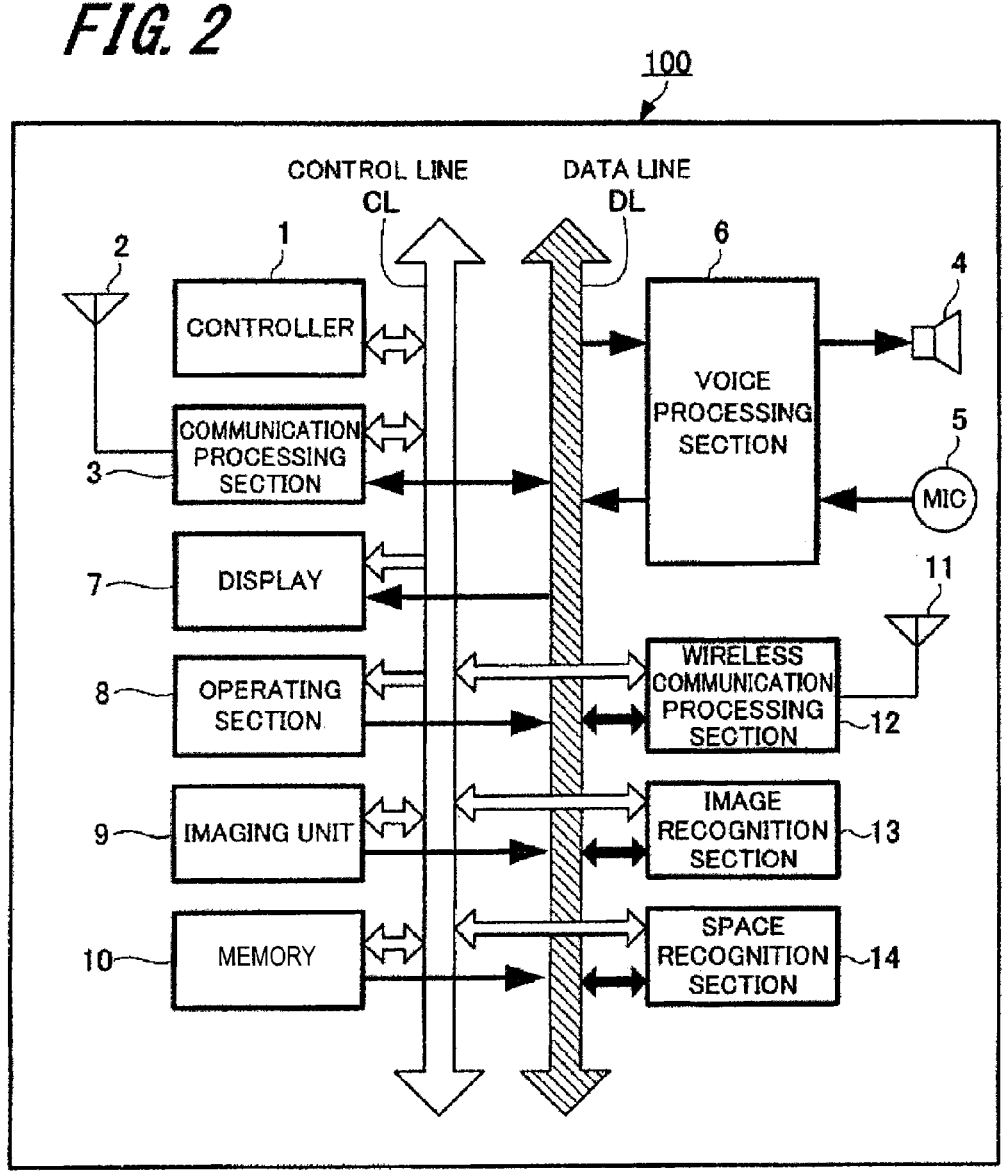
FIG. 2 illustrates an exemplary block diagram of a terminal device.

Next, FIG. 2 illustrates a block diagram for an exemplary terminal device 100. The terminal device 100 of FIG. 2 may be similar to the guest terminals 100G1-G3 or the host terminal 100H. The exemplary terminal device 100 of FIG. 2 includes a controller 1, a communication processing section 3 connected to an antenna 2, a speaker 4, a microphone 5, and a voice processing section 6.

The controller 1 may include one or more Central Processing Units (CPUs), and may control each element in the terminal device 100 to perform features related to communication control, audio signal processing, control for the audio signal processing, image processing and control, and other kinds signal processing. The controller 1 may perform these features by executing instructions stored in a memory 10 or a non-transitory computer readable medium having instructions stored therein.

The antenna 2 transmits/receives electromagnetic wave signals between base stations for performing radio-based communication, such as the various forms of cellular telephone communication.

The communication processing section 3 controls the communication performed between the terminal device 100 and other external devices. For example, the communication processing section 3 may control communication between the base stations for cellular phone communication.

The speaker 4 emits an audio signal corresponding to audio data supplied from the voice processing section 6.

The microphone 5 detects surrounding audio, and converts the detected audio into an audio signal. The audio signal may then be output to the voice processing section 6 for further processing.

The voice processing section 6 demodulates and/or decodes the audio data read from the memory 10, or audio data received by the communication processing section 3 and/or a wireless communication processing section 12. Additionally, the voice processing section 6 may decode audio signals obtained by the microphone 5.

The exemplary terminal device 100 may also include a display 7, an operating section 8, an imaging unit 9, the memory 10, the wireless communication processing section 12 connected to an antenna 11, an image recognition section 13, and a space recognition section 14.

The display 7 may be configured as a touch panel that can detect an input location of a touch instrument (e.g., a finger or stylus). The display 7 may be a Liquid Crystal Display (LCD), or another known display screen technology. In addition to displaying images, the display 7 may display operational inputs, such as numbers or icons, which may be used for control of the terminal device 100. The display 7 may be similar to displays 7g and 7h shown for guest terminals 100G1-G3 and host terminal 100, respectively.

The operating section 8 may include one or more buttons or similar external control elements, which may generate an operation signal based on a detected input by the user. These operation signals may be supplied to the controller 1 for performing related processing and control. As mentioned above, some or all of the aspects of the operating section 8 may be integrated into the touch screen of the display 7.

Images may be produced via the imaging unit 9, which may include an image sensor comprised of a Charge Coupled Device (CCD), Complementary Metal Oxide Semiconductor (CMOS), or the like. For example, an image signal may be generated by the imaging unit 9 when an image formed on a light-receiving surface through a lens is photoelectrically converted. The lens of the imaging unit 9 may, e.g., be arranged on a back surface of the terminal device 100 (i.e., opposite the display 7). Referring to the exemplary arrangement of FIG. 1, a user may hold the terminal device 100 such that the lens of the imaging unit 9 is directed at the guest terminals 100G1-G3. In this case, the images Pi1-Pi3 displayed on the display 7g for terminal identification of the guest terminals 100G1-G3 are reflected in the lens of the imaging unit 9, and an image signal including data corresponding to the images Pi1-Pi3 may be generated and transmitted to the display 7 and/or the image recognition section 13, which performs subsequent image processing described in later paragraphs.

The memory 10 may consist, e.g., of Read Only Memory (ROM), Random Access Memory (RAM), or a memory array comprised of a combination of volatile and non-volatile memory units. The memory 10 may be utilized as working memory by the controller 1 while executing the processing and algorithms of the present disclosure. Additionally, the memory 10 may be used for long-term storage, e.g., of images and information related thereto. For example, arrangement positioning information of other terminal devices, identification information of terminal devices, connection identification information required for radio/wireless communication, and information allocated with respect to arrangement/layout positions may be stored in the memory 10.

The antenna 11 may transmit/receive electromagnetic wave signals to/from other external apparatuses, and the wireless communication processing section 12 may control the wireless communication performed between the other external apparatuses. Bluetooth and Wi-Fi are non-limiting examples of wireless communication protocols that may be used for inter-device communication.

The image recognition section 13 may receive an image input of a predetermined frame rate from the imaging unit 9. Based on the received image input, the image recognition section 13 may identify particular features included in the received image. For example, the image recognition section may identify features of the images Pi1-Pi3 captured by the host terminal 100H of FIG. 1. The features identified by the image recognition section 13 may include identification information, e.g., to identify a particular terminal device captured within an image. For example, the image recognition section 13 may identify that "A" is displayed as image Pi1 on the guest terminal 100G1, and use this identification information to correlate the identified image feature to the terminal device on which it is displayed. Accordingly, the controller 1 may then perform arrangement positioning processing to determine aspects of an arrangement/layout for that particular terminal (i.e., guest terminal 100G1). Thus, a device of the present disclosure may not only recognize the presence of a terminal in an image based on capturing displayed terminal identification information, but also may determine where the recognized terminal is located in 3D space and/or relative to other detected terminals.

In order to perform identification of, e.g., a particular guest terminal, by analyzing images displayed on the guest terminal, it is preferred that there is no duplication in identification information when multiple guest terminals are captured in the same image by a host terminal. For example, if each of the images Pi1-Pi3 from FIG. 1 included identical identification information (e.g., all the displays showed an "A"), then it would be difficult for the host terminal 100H to positively distinguish between guest terminals. Thus, the image recognition section 13 may recognize instances of such duplication, and perform processing to overcome this problem.

For example, in response to the image recognition section 13 identifying terminal identification information duplication between guest terminals, the terminal 100 may output a signal instructing one or more of the duplicated guest terminals to change their displayed identification information. Alternatively, at a time at which guest terminals make a connection request to a network on which the host terminal is connected, the MAC address or other unique identifier included in the connection request may be used to generate a unique image for display on the guest terminal, which may be used to perform the positional identification features of the present disclosure. The generated unique image may, e.g., be generated by the host terminal and transmitted to the guest terminal(s), generated by the guest terminal(s) in response to an instruction from the host terminal, or obtained from an external source by the guest terminal based on an instruction from the host terminal. Non-limiting examples of elements that may be included in a unique identification image include a serial number, a device ID, text characters, numbers, an icon, a nickname, an image, a color, or a barcode.

The space recognition section 14 may compute an arrangement position and/or allocate a layout position of, e.g., another terminal, based on image features detected by the image recognition section 13. In particular, the space recognition section 14 may convert a marker coordinate system, which is used to identify three-dimensional coordinates of real space corresponding to positions captured in an image, to a camera coordinate system. The camera coordinate system may then be used by the space recognition section 14 to determine a position and/or a layout of features contained in an image displayed on a guest terminal. The controller 1 may then allocate information based on the arrangement position determined by the space recognition section 14. For example, the controller 1 may assign information corresponding to an image, a game, or an audio signal to each guest terminal detected in an image and identified using the above-described arrangement position detection. Information relating to the assigned data may be transmitted to each respective guest terminal. Additionally or alternatively, origin data corresponding to an origin of the assigned data may be transmitted to each respective guest terminal. For example, rather than transmitting an image directly to a guest terminal based on an arrangement position, the host terminal may transmit a URL link to the guest terminal as an allocation origin for the assigned data. In this case, the guest terminal may then download the assigned data corresponding to the URL link.

Figure 3:
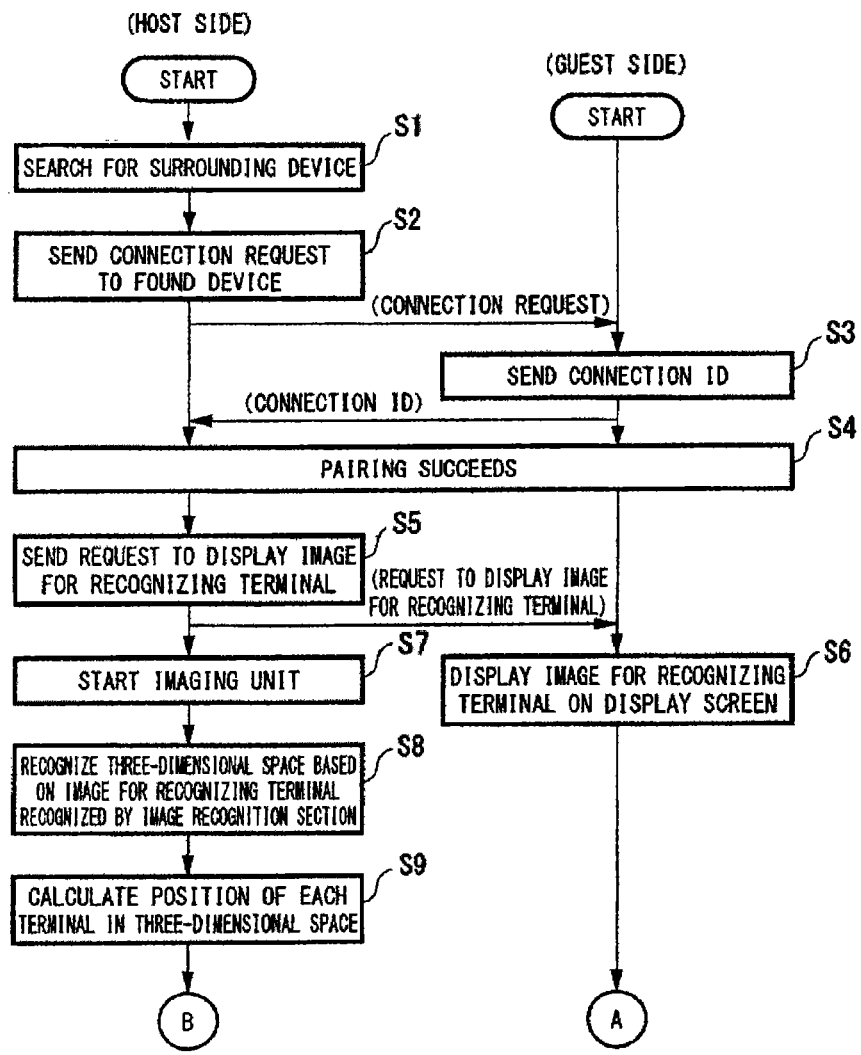

Next, FIGS. 3 and 4 provide an exemplary flow chart for performing aspects of image processing and position detection processing according to the present disclosure. For illustration purposes, FIGS. 3 and 4 provide the method steps from the perspective of both the host terminal and the guest terminal. However, this should not be construed as limiting. Further, the steps indicated in FIGS. 3 and 4 may be performed sequentially and/or in parallel by the host terminal and/or the guest terminal. Moreover, steps shown as being performed by the host (guest) terminal may be performed by the guest (host) terminal.

Referring first to FIG. 3, the host terminal at step S1 searches for surrounding guest terminal devices via wireless communication processing section 12. In response to detecting a surrounding guest terminal device, the host terminal at step S2 sends a connection request to each terminal device found in step S1. In response to receiving the connection request from the host terminal, the guest terminal at step S3 sends a connection ID to the host terminal. The connection ID may include unique descriptive information identifying the guest terminal (e.g., a device ID or a serial number). In response to receiving a connection ID from a guest terminal, the host terminal at step S4 associates each guest terminal from which a connection ID was received as a paired terminal device with the host terminal.

For simplicity, subsequent steps of FIGS. 3 and 4 are described as relating to a single guest terminal; however, it should be understood that the host terminal and the guest terminal may perform the steps for a plurality of guest terminals.

At step S5, the host terminal sends a request to the paired guest terminal to display an image for recognizing the guest terminal (i.e., terminal identification information). Alternatively, at step S5 the host terminal may transmit via the wireless communication processing section 12 an image to be displayed as a terminal identifier for the guest terminal. In response to receiving the request to display an image and/or receiving the image to display as a terminal identifier, the guest terminal at step S6 displays the image for recognizing the guest terminal on its display 7.

If not already begun, the host terminal at step S7 starts processing related to the image unit 9. The processing for the image unit 9 may, e.g., be triggered by executing an application for performing features of the present disclosure, or alternatively the initialization of processing for the image unit 9 may trigger the processing steps relating to terminal identification and position arrangement detection described in the present disclosure.

After capturing an image including the guest terminal displaying the image used for terminal identification, the host terminal at step S8 recognizes via the image recognition section 13 the terminal identification image displayed on the guest terminal. The recognition may include analyzing all or a portion of the terminal identification image displayed on the guest terminal. The recognition may further include associating detected terminal identification information with the guest terminal and/or identifying that a particular guest terminal is present in the image captured by the host terminal.

At step S9, the host terminal calculates an arrangement position of each guest terminal recognized by the image recognition section 13. The arrangement position calculated at step S9 may include at least information describing a position in three-dimensional space of each guest terminal identified in preceding steps. The arrangement position may be described in absolute coordinates or another coordinate system, using an arbitrary point as a reference.

At step S10, the host terminal establishes a link between each guest terminal whose position has been calculated in three-dimensional space. The link may be established at step S10 using, e.g., identification information corresponding to each guest terminal. The identification information may include, e.g., the connection ID obtained from step S3.

Next, at step S11 the host terminal assigns data to the guest terminal based on the calculated arrangement position of the guest terminal. The assigned data may include, e.g., an image, a video, an audio signal, and/or information describing a play order of a game.

At step S12, the host terminal sends the assigned data, or instructions for obtaining the assigned data, to the guest terminal. In the case in which instructions for obtaining the assigned data are sent, the instructions may, e.g., include a URL link or the like for downloading the assigned data. In response to receiving the assigned data or the instructions for obtaining the assigned data at step S13, the guest terminal at step S14 displays the assigned data on its display screen. Alternatively, in the case where the assigned data corresponds to audio data, the guest terminal outputs the assigned data from its speaker.

Next, exemplary aspects of performing data allocation based on recognizing terminal identification information and determining an arrangement position will now be described with regard to FIGS. 5 and 6.

Referring first to FIG. 5, the figure illustrates a source image Pd being segmented into three images, Pd1, Pd2, and Pd3. As a non-limiting example, source image Pd may be segmented by the host terminal using an image stored in memory; or by obtaining an image, segmenting the image, and transmitting the segmented images to the guest terminals. The segmented images may then be displayed by respective guest terminals, based upon an instruction received from the host terminal indicating the image to be displayed. Alternatively, the host terminal may transmit an instruction to each paired guest terminal, where the instruction includes information regarding the arrangement position determination, as well as information describing an image (or portion thereof) to be displayed based upon the arrangement position determination. Each guest terminal may then display the received image from the host terminal, or obtain a full or partial image from an origin identified by the instruction sent from the host terminal.

Referring now to FIG. 6A, the figure illustrates three exemplary guest terminals 100G1, 100G2, and 100G3, which each respectively display the segmented images Pd1, Pd2, and Pd3. As described above, the guest terminals may display their respective segmented images based upon an instruction indicating a predetermined relationship between determined arrangement position and a corresponding segmented image. As a non-limiting example, a host terminal may capture an image of the three guest terminals as shown in FIG. 6A. The host terminal may then determine three-dimensional arrangement positions of the guest terminals. Based on the three-dimensional arrangement positions, the host terminal may then determine a layout arrangement indicating the guest terminal 100G3 is the left-most terminal, the guest terminal 100G1 is the center terminal, and the guest terminal 100G2 is the right-most terminal in the captured image. Accordingly, upon performing the arrangement position detection and layout arrangement determination, the host terminal may then assign left-most terminal 100G3 the left-most portion Pd1, the center terminal 100G1 the center portion Pd2, and the right-most terminal 100G2 the right-most portion Pd3. The host terminal may then transmit the assigned data to each respective guest terminal, or alternatively transmit instructions for obtaining the assigned data. In response to receiving the assigned data or the instructions for obtaining the assigned data, each respective guest terminal may then display the assigned data on their display screens, as shown in the example of FIG. 6A.

Figure 6B:
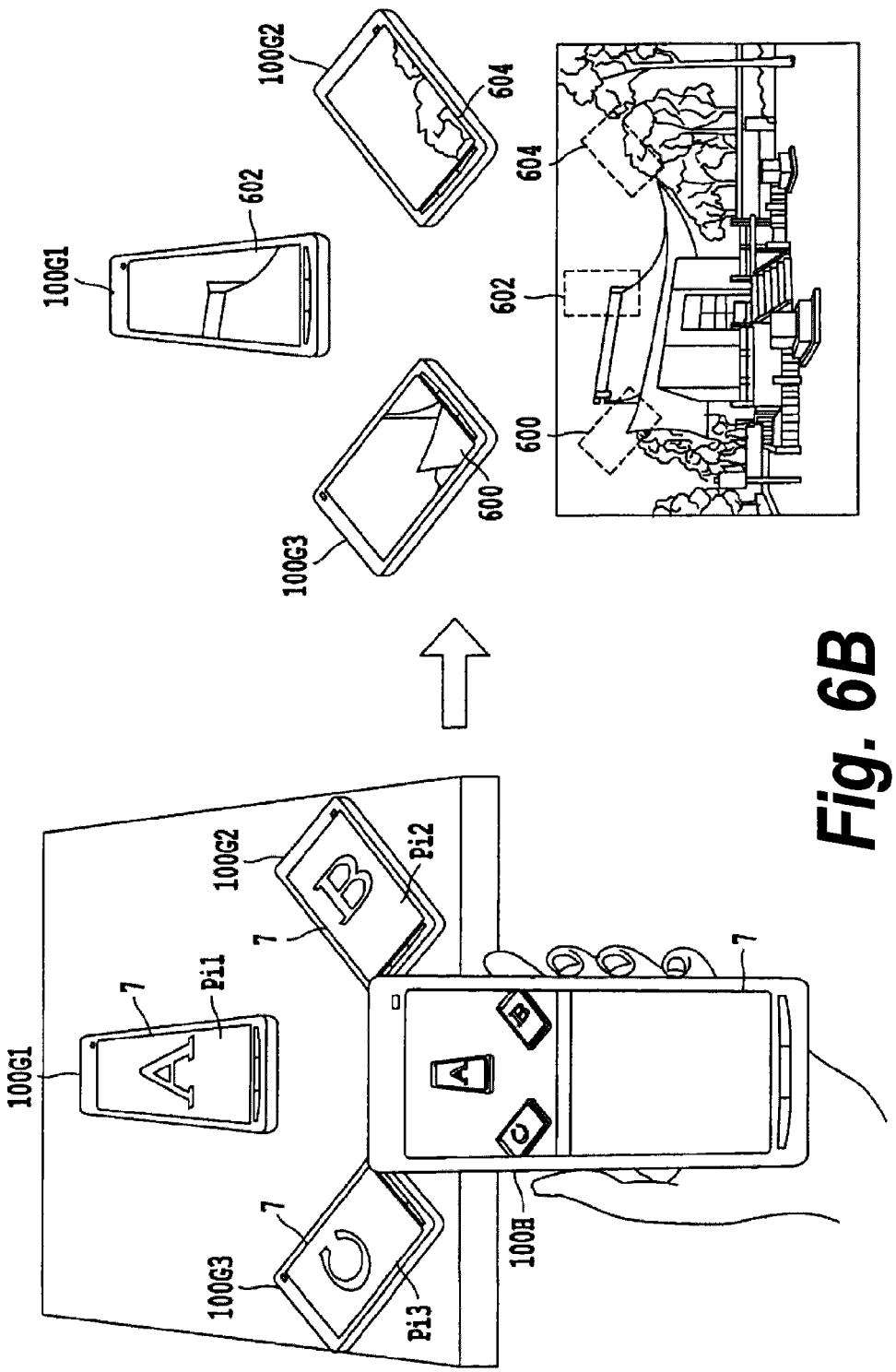

In another aspect of the present disclosure, the host terminal may determine features relating to the three-dimensional arrangement positions of guest terminals. For example, the host terminal may determine an orientation, size, dimension, shape, angle, etc. of a guest terminal. Assigned data and/or instructions for obtaining the assigned data may then be transmitted based on the determined features of the three-dimensional arrangement positions. As a non-limiting example, FIG. 6B illustrates the host terminal 100H capturing an image of the guest terminals 100G1-G3. In response to determining an orientation of the three guest terminals in the captured image, the host terminal 100H may determine three corresponding areas 600, 602, and 604, of the source image Pd. The orientations of the areas 600, 602, and 604 may correspond to the determined orientations of the guest terminals 100G1-G3. The host terminal 100H may then determine the assigned data corresponds to the portion of the source image Pd included in the areas 600, 602, and 604. The assigned data may then be transmitted to each respective guest terminal 100G1-G3, where the data is displayed.

Next, FIG. 7 illustrates another non-limiting example of an aspect of performing terminal identification using a captured image, and corresponding arrangement position determination processing based upon the captured terminal identification information. The non-limiting example of FIG. 7 illustrates assigning a game play order based upon a determined arrangement position of guest terminals. In the example of FIG. 7, a host terminal may capture an image of the three guest terminals 100G1, 100G2, and 100G3. Based upon the captured image, the host terminal may determine that guest terminal 100G2 is the left-most terminal in the image, guest terminal 100G1 is the center terminal in the image, and guest terminal 100G3 is the right-most terminal in the image. An order in which a game should be played may then be assigned, based upon the determined arrangement positions. For example, the host terminal may assign the left-most terminal 100G2 the first position in the gaming order, the center guest terminal 100G1 the second ordering in the game, and the right-most guest terminal 100G3 the third ordering position in the game. The assigned game ordering may then be transmitted from a host terminal to each respective guest terminal, or an instruction for obtaining the assigned game order may be transmitted to the guest terminals. In response to receiving the assigned ordering data or the instructions for obtaining the assigned ordering data, each respective guest terminal displays on their display 7g the assigned ordering data, as shown in FIG. 7. It should be noted that while the example of FIG. 7 assigns ordering data sequentially from left to right, this is not limiting, and the present disclosure may easily be adapted such that other ordering assignments are performed based upon arrangement position determination. For example, the center guest terminal in a captured image may be assigned the first position in the gaming order. Additionally, it should be noted that the game may be cooperatively played on the host terminal and the guest terminals across a network, or may be played offline. In the case in which the game is played on a network, the assigned ordering from the host terminal may dictate when a particular action may be taken in the game (e.g., the game may be "locked" until the player's turn).

Figure 8:
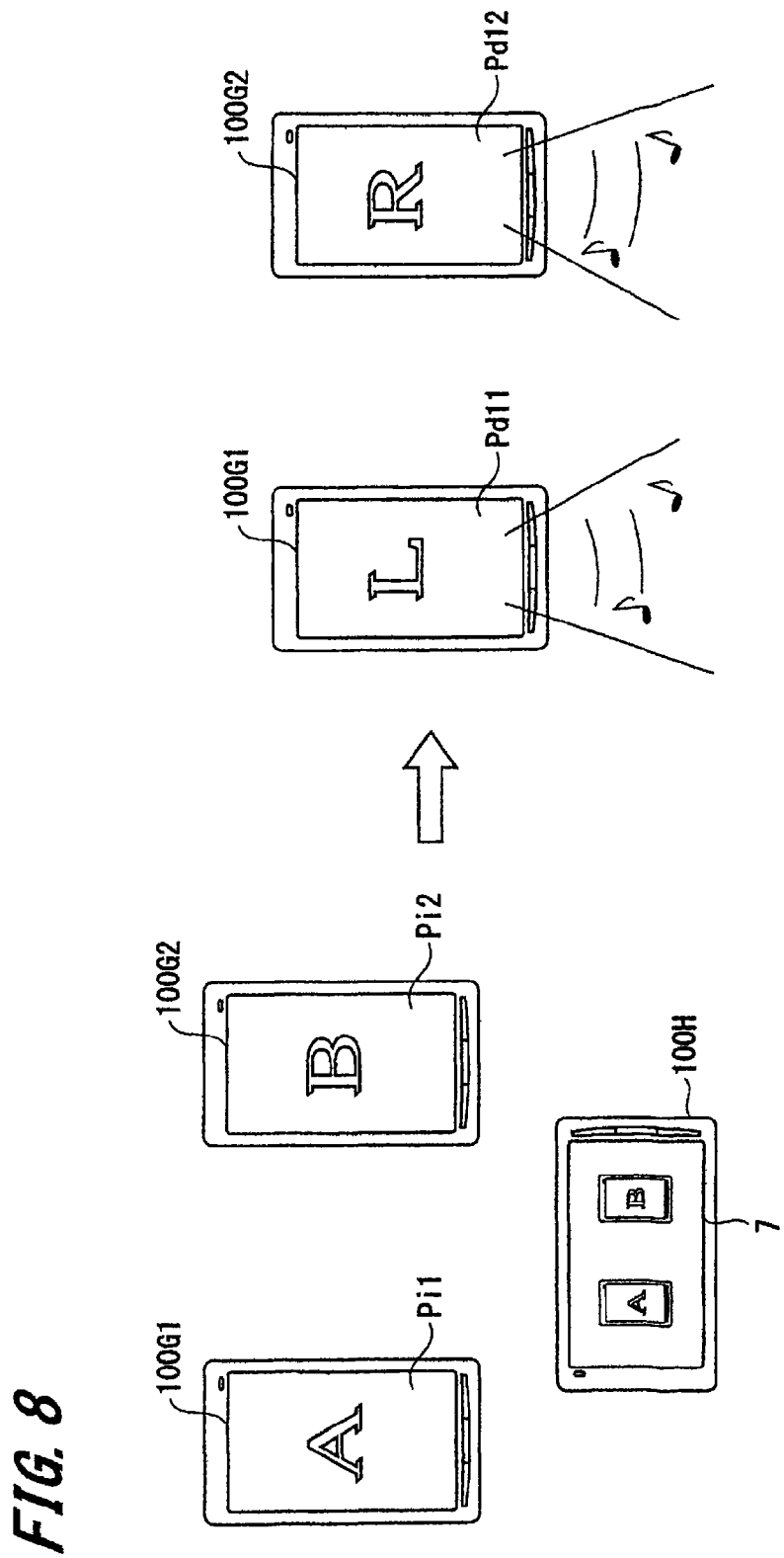

Next, FIG. 8 illustrates another non-limiting example of aspects of performing data allocation based upon an arrangement position determination of terminals in an image. Referring to FIG. 8, a host terminal may capture an image of guest terminals 100G1 and 100G2. As shown in the figure, guest terminal 100G1 displays a character "A" (image Pi1) and the guest terminal 100G2 displays a character "B" (image Pi2). Based upon the captured image, the host terminal may determine that guest terminal 100G1 displaying image Pi1 is on the left-most portion of the captured image, and the guest terminal 100G2 displaying image Pi2 is on the right-most portion of the captured image. In response to this image recognition and arrangement position detection, the host terminal may assign a left stereo channel to the left-most guest terminal 100G1, and a right stereo channel to the right-most guest terminal 100G2. The host terminal may then transmit the left stereo channel portion of an audio signal to the guest terminal 100G1, and the right stereo channel portion of the audio signal to the guest terminal 100G2. In response to receiving the respective left and right portions of the stereo signal, the guest terminal 100G1 may output the left stereo channel portion of the audio signal on its speaker, and the guest terminal 100G2 may output the right stereo channel portion of the audio signal on its speaker. Alternatively, the host terminal may transmit an instruction for obtaining an audio signal, and further instructions to each guest terminal for outputting a stereo channel of the audio signal, based upon the foregoing arrangement position determination. In this case, the guest terminals may, e.g., download an audio signal and determine which portion of the audio signal channels to output on their respective guest terminals. Additionally, the host terminal may respectively transmit or provide instructions for obtaining images Pd11 and Pd12 to guest terminals 100G1 and 100G2 for display on the respective guest terminals. As shown in FIG. 8, the image Pd11 corresponds to a character "L", indicating the guest terminal 100G1 is outputting the left stereo channel of the audio signal, and the guest terminal 100G2 may display image Pd12 corresponding to a character "R", indicating the guest terminal 100G2 is outputting the right stereo channel of the audio signal.

It should be appreciated that FIG. 8 is a non-limiting example of outputting assigned audio data based upon an arrangement position determination of terminals using a captured image, and the present disclosure may easily be adapted such that other aspects of assigning audio signal data to guest terminals is utilized. For example, the host terminal may capture any number of guest terminals in an image, and further segment an audio signal based upon the arrangement position determination. For example, five guest terminals may be captured in an image by the host terminal, and based on the determined arrangement position, the guest terminals may receive instructions for outputting one or more channels of a 5.1 stereo surround sound signal. As another non-limiting example, the host terminal may assign a captured guest terminal the playback of a specific instrument in an audio signal, where the combined playback of all instrument portions of the audio signal forms an "orchestra" of guest terminals. In this case, each instrument included in the audio signal may be assigned an independent channel, and one or more of the independent channels may be transmitted to a guest terminal, based on determined arrangement position. Similarly, a particular singer may be assigned instead of an instrument.

Figure 9:
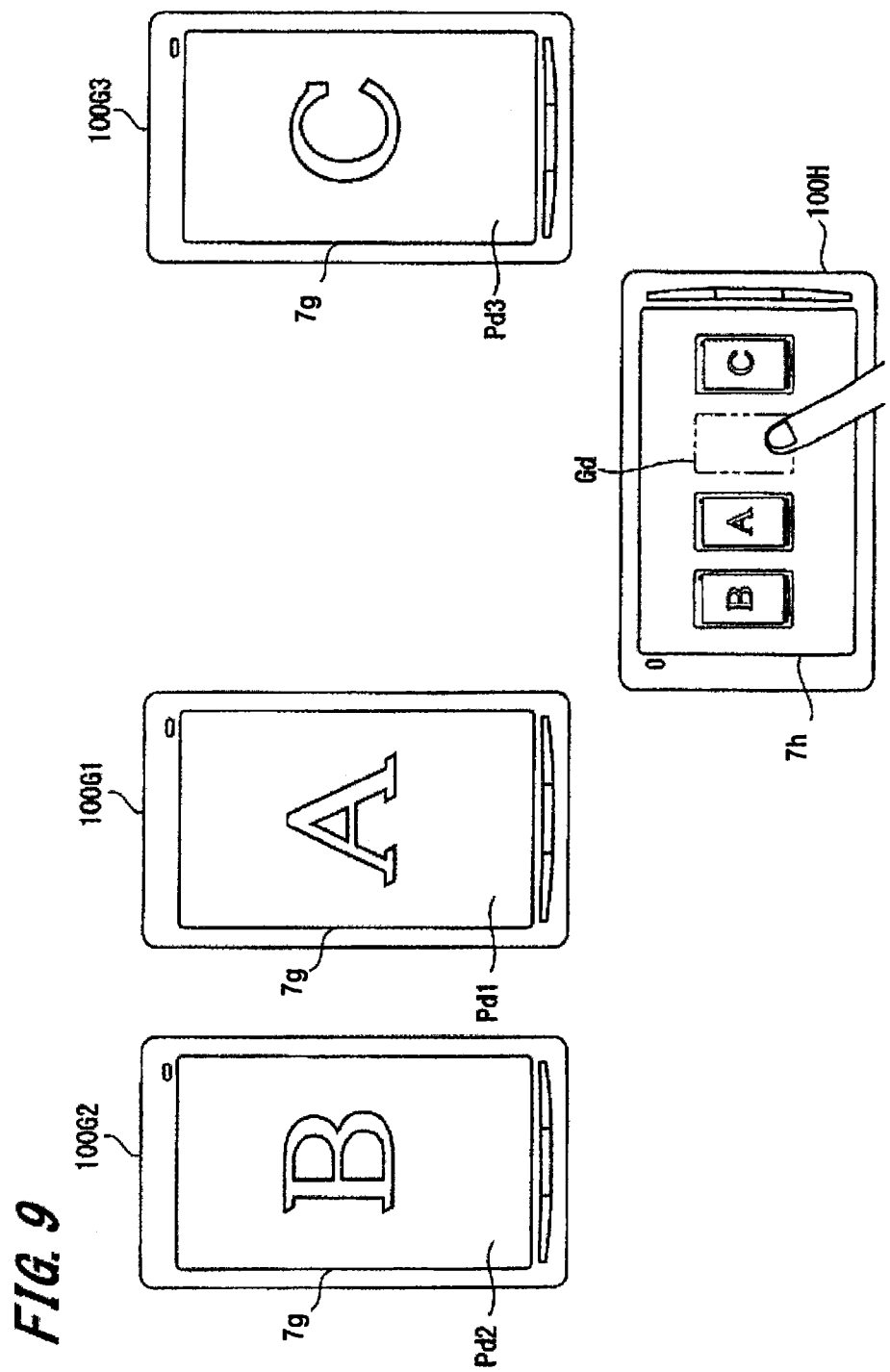

Next, FIG. 9 illustrates another non-limiting example of aspects of performing data allocation based upon an arrangement position determination of terminals in an image. In the example of FIG. 9, the host terminal 100H may capture an image of the guest terminals 100G1, 100G2, and 100G3, respectively displaying terminal identification information images Pd1, Pd2, and Pd3. The host terminal 100H may identify each respective guest terminal in the image, based upon the displayed terminal identification information image, and determine an arrangement position for each respective guest terminal in 3D space. The host terminal 100H may then receive an input, e.g., via the operating section 8 and/or a detected touch on a touch screen of the display 7h, indicating an arrangement position of the host terminal 100H with respect to the determined arrangement positions of the three guest terminals. For example, referring to FIG. 9, the arrangement of the three guest terminals is displayed on the display 7h of the host terminal 100H, where an input area Gd is illustrated on the display 7h. In response to receiving an input instruction corresponding to the input area Gd, the host terminal 100H may assign an arrangement position corresponding to the host terminal 100H to the 3D position of the input area GD. That is, the host terminal 100H may identify, e.g., that the host terminal 100H will be located between guest terminals 100G1 and 100G3. Accordingly, the above-described exemplary aspects of assigning data based upon an arrangement position determination and/or layout allocation may then be performed utilizing both the guest terminals and the host terminal. For example, a gaming order may be assigned to each of the guest terminals, as well as the host terminal, such that the host terminal 100H's user may be included in the game. In the example of FIG. 9, the guest terminal 100G2 may be assigned a first position in the game, the guest terminal 100G1 may be assigned a second position in the game, the host terminal 100H may be assigned a third position in the game, and the guest terminal 100G3 may be assigned the fourth position in the game. Additionally, the host terminal 100H may be utilized to output a portion of an audio signal in conjunction with the guest terminals 100G1-G3, as in the example of FIG. 8.

Figure 10:
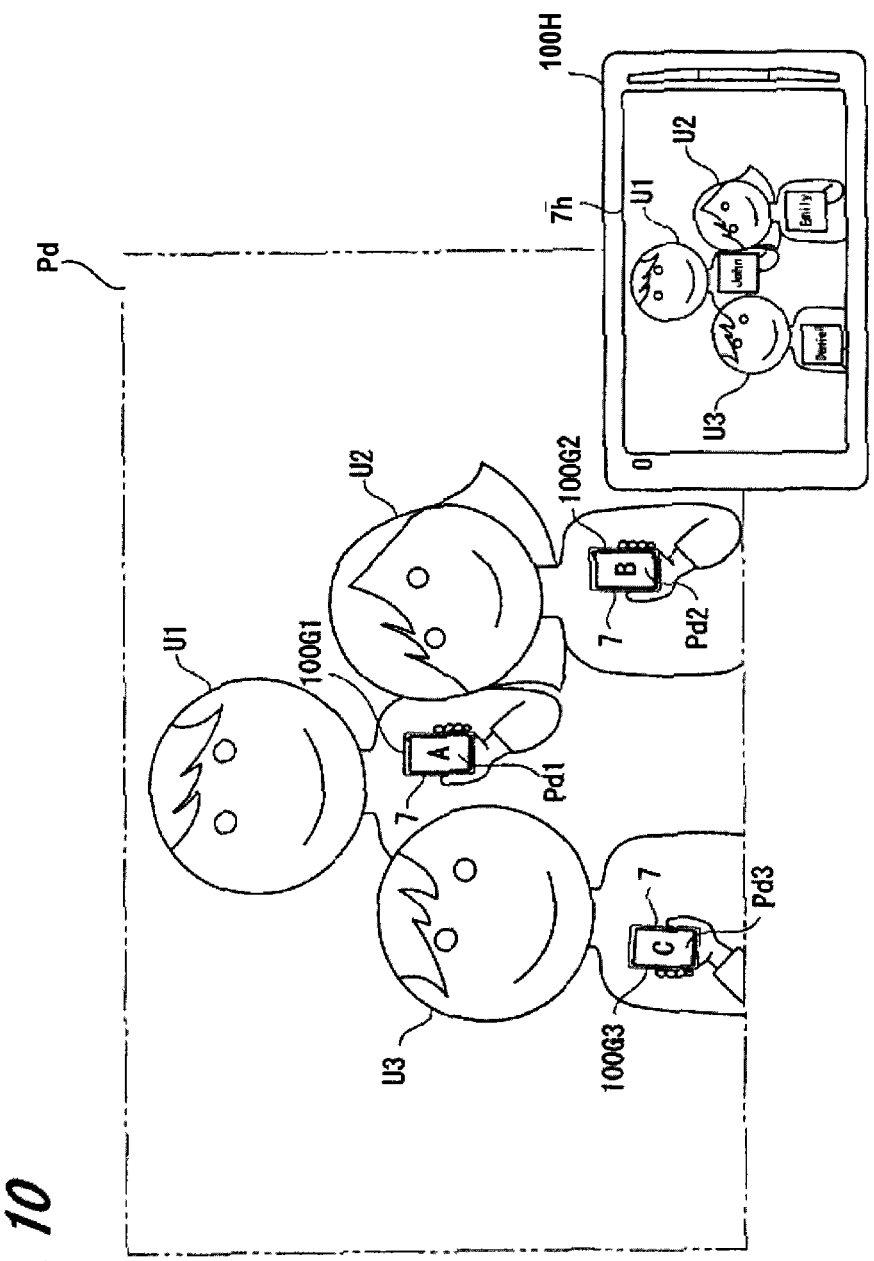

Next, FIG. 10 illustrates another non-limiting example of aspects of performing terminal identification and arrangement position determination according to the present disclosure. In the example of FIG. 10, the host terminal 100H may capture an image Pd including users U1, U2, and U3. The users in the image Pd are respectively holding guest terminals 100G1, 100G2, and 100G3. The guest terminals are respectively displaying terminal identification information as images Pd1, Pd2, and Pd3. In response to capturing the image Pd and/or establishing a connection and receiving an assignment ID from the guest terminals, the host terminal 100H may assign each respective user to their respective guest terminal. For example, the host terminal 100H may analyze the image Pd and determine that user U1 is holding the guest terminal 100G1, which displays the terminal identification image Pd1. The host terminal 100H may then correlate user U1 to the guest terminal 100G1, e.g., by a lookup table indicating the relationship, and pair the guest terminal 100G1 to the user U1 (e.g., as a stored relationship in memory). Similarly, the host terminal 100H may determine that user U1 corresponds to a particular name, such as "John."

Alternatively, the host terminal 100H may obtain the image Pd from a source other than its imaging unit 9. For example, the host terminal 100H may obtain the image Pd from its memory, download the image from another terminal device, or obtain the image Pd from a social networking site. Accordingly, the processing relating to terminal identification and arrangement position determination may be performed in this way by bypassing the imaging unit 9. For example, the host terminal 100H may obtain the image Pd from a social networking site, where the social networking site has previously assigned user information (e.g., names)

to each user displayed in the image Pd, e.g., by using face recognition software. In this case, the host terminal 100H may obtain the corresponding user identification information at the same time as obtaining the image Pd. This user identification information may then be utilized by the host terminal 100H to assign data to the detected guest terminals in the image Pd. In the example of FIG. 10, the host terminal 100H may detect that user U3 is holding the guest terminal 100G3 displaying terminal identification image Pd3 in the left portion of the image Pd, the user U1 is holding the guest terminal 100G1 displaying terminal identification image Pd1 in the center of the image Pd, and the user U2 is holding the guest terminal 100G2 displaying the terminal identification image Pd2 in the right portion of the image Pd. Consequently, the host terminal 100H may perform the above-described arrangement position determination, and additionally assign a user identification to the respective users included in the image Pd. This assigned user information may then be superimposed on the image displayed on the display 7h of the host terminal 100H. For example, the host terminal 100H may superimpose a name of each user in a position corresponding to the position at which the user held the guest terminal in the original image Pd.

In the example of FIG. 10, the host terminal 100H determines that user U3 corresponds to "Daniel," the user U1 corresponds to "John," and the user U2 corresponds to "Emily." The host terminal 100H may then superimpose these names on the image displayed on its display 7h. The image on the display 7h of the host terminal 100H may then remain following a time at which each user in the image Pd lowers their respective guest terminals. This may provide the benefit of prompting a user of the host terminal 100H with a name of each user in the photo to be used later.

Additionally, by obtaining user information (i.e., a name) of each user in the image Pd as assignment data, e.g., when a connection is established between the host terminal and the guest terminals, the processing of the present disclosure provides the benefit of not relying on a predetermined relationship of the user and its corresponding user information. That is, in the case of, e.g., a social networking site relying upon facial recognition software, the social networking site must first know information about the user prior to assigning a name to the user. For example, the user must enter their name when registering an account and uploading pictures. However, in the case of FIG. 10, a predetermined relationship and/or a name is not necessary for assigning user information to the displayed users based upon the determined arrangement position. Rather, the user information is transmitted from each guest terminal when a connection is established, and the host terminal 100H may overlay the user information without prior knowledge of the user's name.

It should be noted that while the example of FIG. 10 shows the user information (i.e., names) overlaid on the image at a position corresponding to the position at which each user held the guest terminal in the image Pd, this arrangement is not limiting, and the user information may be superimposed on the image by the host terminal 100H at any position. Additionally, the host terminal 100H may, following arrangement position determination and user identification, store the image shown in the display 7 on FIG. 10 in the memory 10 of the host terminal 100H, transmit the image to each guest terminal 100G1 through 100G3, and/or upload the image to an external destination, such as a social networking site.

It should be appreciated that aspects of the present disclosure are not limited to performing terminal identification and/or arrangement position determinations only on two-dimensional images, and three-dimensional images may be used as well. Similarly, arrangement position determinations may be performed in more or less than three dimensions. In any case, the absolute coordinates in space may be derived, and/or relative coordinates or a descriptor (e.g., "left," "right," or "center") may be used.

Additionally, the terminal identification and arrangement position determinations may be performed automatically by the host terminal and/or the guest terminal, or may be performed in response to receiving an input, e.g., from a user via the operation section 8 or a touch screen on the display 7. For example, the user may allocate a order in a game, a portion of an audio signal, and/or a portion of an image to guest terminals based upon an order in which touch inputs are received at the host terminal, or alternatively from a manual input indicating the ordering and/or arrangement position. Further, the host terminal of the present disclosure may be configured such that terminal identification and/or arrangement position determination processing is performed only on a subset of guest terminals detected in an image captured by the host terminal.

Moreover, the present disclosure does not limit the host terminals and/or the guest terminals described herein to mobile phones, and other devices may easily be used to conform with the present disclosure. For example, the host terminal and/or the guest terminal may take the form of a smart phone, a personal digital assistant (PDA), a tablet, a display device, a projector, a television, a desktop computer, a laptop computer, or the like.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process.

It must be noted that, as used in the specification and the appended claims, the singular forms "a," "an," and "the" include plural referents unless the context clearly dictates otherwise.

The invention claimed is:

1. An information processing device comprising:
circuitry configured to
capture an image of a first guest device;
communicate with the first guest device;
recognize, in the image of the first guest device, identification information corresponding to the first guest device, the identification information being displayed on a screen included on the first guest device;
receive a user input indicating a designated relative arrangement of the information processing device and the first guest device, the designated relative arrangement comprising a location of an insertion of the information processing device into a determined arrangement that includes the first guest device and excludes the information processing device;
calculate, based on the recognition of the identification information in the image and the received user input, an arrangement position of the first guest device;
assign, based on the designated relative arrangement and the calculated arrangement position, first assigned data to the first guest device and second assigned data to the information processing device;
transmit both the calculated arrangement position and information associated with the first assigned data to the first guest device; and
process the second assigned data in the information processing device.

2. The information processing device of claim 1, wherein the information associated with the first assigned data includes an instruction for obtaining the first assigned data.

3. The information processing device of claim 1, wherein the information associated with the first assigned data includes a source image.

4. The information processing device of claim 1, wherein the circuitry is configured to divide a source image into a plurality of segmented images, and to include one or more of the segmented images in the information associated with the first assigned data and an additional one or more of the segmented images in the second assigned data.

5. The information processing device of claim 1, wherein:
the captured image includes a plurality of guest devices,
the circuitry is configured to calculate the arrangement position for each guest device, of the plurality of guest devices, to determine the determined arrangement,
the circuitry is configured to divide a source image into a plurality of segmented images, where a number of the plurality of segmented images is greater than or equal to a number of the plurality of guest devices in the captured image,
the circuitry is configured to assign one of the segmented images to each guest device, of the plurality of guest devices, and to the information processing device based on the calculated arrangement positions, and
the circuitry is configured to transmit the assigned segmented image to each guest device, of the plurality of guest devices.

6. The information processing device of claim 1, wherein the information associated with the first assigned data includes an audio signal.

7. The information processing device of claim 6, wherein:
the audio signal is comprised of a plurality of stereo channels, and
the circuitry is configured to select, based on the calculated arrangement position, one or more of the plurality of stereo channels to include in the information associated with the first assigned data.

8. The information processing device of claim 7, wherein:
the audio signal is music,
the audio signal is segmented such that each instrument included in the music is assigned an independent channel, and
the circuitry is configured to include one or more of the independent channels in the information associated with the first assigned data.

9. The information processing device of claim 7, wherein the circuitry is configured to include a description of the selected one or more stereo channels in the information associated with the first assigned data.

10. The information processing device of claim 1, further comprising:
a display configured to output the captured image, wherein
the circuitry is configured to control the display to display a user interface together with the captured image on the display,
the circuitry is configured to receive the user input through the user interface.

11. The information processing device of claim 1, wherein:
the captured image includes a plurality of guest devices, and
the circuitry is configured to
determine that identical identification information is displayed by both the first guest device and a second guest device in the captured image,
assign independent identification information to the first guest device and the second guest device, the independent identification information of the first guest device being different than that of the second guest device, and
transmit instructions to the first guest device and the second guest device to display the assigned independent identification information.

12. The information processing device of claim 1, wherein
the information associated with each of the first assigned data and the second assigned data includes a play order indication corresponding to a game.

13. The information processing device of claim 12, wherein:
the game is played cooperatively by the information processing device and the first guest device on a network, and
the assigned play order determines a time at which the game is available for play.

14. The information processing device of claim 1, wherein
the information associated with the first assigned data includes a name of a user associated with the recognized identification information.

15. The information processing device of claim 14, further comprising:
a display configured to output the captured image, wherein
the circuitry is configured to control the display to overlay, on the captured image displayed on the information processing device, the name of the user associated with the recognized identification information at a position corresponding to the calculated arrangement position of the guest device.

16. The information processing device of claim 1, wherein
the arrangement position corresponds to one or more of a three-dimensional coordinate of the guest device in space, an orientation of the guest device, and a relative position of the guest device with respect to another element included in the captured image.

17. The information processing device of claim 1, wherein
the circuitry is configured to acquire the identification information, and transmit the acquired identification information to the first guest device.

18. The information processing device of claim 17, wherein
the circuitry is configured to transmit the acquired identification information to the first guest device in response to receiving a connection identification signal from the first guest device.

19. A method performed by an information processing device, the method comprising:
capturing an image of a first guest device;
recognizing, in the image of the first guest device, identification information corresponding to the first guest device, the identification information being displayed on a screen included on the first guest device,
receiving a user input indicating a designated relative arrangement of the information processing device and the first guest device, the designated relative arrangement comprising a location of an insertion of the information processing device into a determined arrangement that includes the first guest device and excludes the information processing device;
calculating, based on the identification of the identification information in the image and the received user input, an arrangement position of the first guest device,
assigning, based on the designated relative arrangement and the calculated arrangement position, first assigned data to the first guest device and second assigned data to the information processing device,
transmitting, to the first guest device, both the calculated arrangement position and information associated with the first assigned data; and
processing the second assigned data in the information processing device.

20. A non-transitory computer readable medium having instructions stored therein that when executed by one or more processors, causes the one or more processors to perform a process comprising:
capturing an image of a first guest device;
recognizing, in the image of the first guest device, identification information corresponding to the first guest device, the identification information being displayed on a screen included on the first guest device,
receiving a user input indicating a designated relative arrangement of the information processing device and the first guest device, the designated relative arrangement comprising a location of an insertion of the information processing device into a determined arrangement that includes the first guest device and excludes the information processing device;
calculating, based on the identification of the identification information in the image and the received user input, an arrangement position of the first guest device,
assigning, based on the designated relative arrangement and the calculated arrangement position, first assigned data to the first guest device and second assigned data to the information processing device,
transmitting, to the first guest device, both the calculated arrangement position and information associated with the assigned data; and
processing the second assigned data in the information processing device.

\* \* \* \* \*